(12) United States Patent
Shao et al.

(10) Patent No.: US 12,436,529 B2
(45) Date of Patent: Oct. 7, 2025

(54) INTERNET OF THINGS (IOT) SYSTEMS AND METHODS FOR PIPELINE VALVE CALIBRATION BASED ON SMART GAS SAFETY SUPER VISION

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Lei He, Chengdu (CN); Yuefei Wu, Chengdu (CN); Yunbai Chen, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 19/048,963

(22) Filed: Feb. 10, 2025

(65) Prior Publication Data

US 2025/0181066 A1 Jun. 5, 2025

(30) Foreign Application Priority Data

Dec. 31, 2024 (CN) .......................... 202411977187.0

(51) Int. Cl.
G05B 23/02 (2006.01)
(52) U.S. Cl.
CPC ..... *G05B 23/0283* (2013.01); *G05B 23/0254* (2013.01)
(58) Field of Classification Search
None
See application file for complete search history.

(56) References Cited

U.S. PATENT DOCUMENTS

2023/0230050 A1* 7/2023 Shao ................. G16Y 10/35
 702/184
2023/0366706 A1* 11/2023 Shao ................. G16Y 40/20
 (Continued)

FOREIGN PATENT DOCUMENTS

CN 105741186 A 7/2016
CN 114677043 A * 6/2022 ..... G06Q 10/063114
 (Continued)

OTHER PUBLICATIONS

Peng, Chaolong, Analysis on Operation Management and Maintenance of Electro-hydraulic and Electric Ball Valve in Gas Pipeline Network, Technology Development of Enterprise, 2015, 3 Pages.
(Continued)

*Primary Examiner* — David Earl Ogg
(74) *Attorney, Agent, or Firm* — METIS IP LLC

(57) ABSTRACT

Provided is an Internet of things (IoT) system for pipeline valve calibration based on smart gas safety supervision, comprising a smart gas government safety supervision management platform, a smart gas government safety supervision sensor network platform, a smart gas government safety supervision object platform, a gas company management platform, a gas company sensor network platform, a gas equipment object platform, and a gas equipment maintenance object platform. The smart gas government safety supervision management platform is configured to generate a first calibration instruction. The gas company management platform is configured to determine a first calibration result; determine a flexible calibration batch; obtain a second calibration result; determine valves pending maintenance of gas pipelines; determine work order information; determine a work order dispatch instruction based on the work order information; and adjust a working parameter of an auxiliary (Continued)

device operating with the valves pending maintenance based on the parameter adjustment instruction.

8 Claims, 5 Drawing Sheets

(56) References Cited

U.S. PATENT DOCUMENTS

2023/0385783 A1* 11/2023 Shao .................. F17D 5/02
2024/0411944 A1   12/2024 Reinhart

FOREIGN PATENT DOCUMENTS

| | | |
|---|---|---|
| CN | 115641108 A | 1/2023 |
| CN | 118654240 A | 9/2024 |
| JP | 2008028756 A | 2/2008 |
| KR | 20200046142 A | 5/2020 |
| KR | 20210084140 A | 7/2021 |
| RU | 2752449 C1 | 7/2021 |
| RU | 2760167 C1 | 11/2021 |

OTHER PUBLICATIONS

First Office Action in Chinese Application No. 202411977187.0 mailed on Feb. 21, 2025, 20 pages.
Decision to Grant a Patent in Chinese Application No. 202411977187.0 mailed on Apr. 8, 2025, 4 pages.
Shao, Zehua et al., Perception and Control of Gas Abnormity of IoT Intelligent Gas Meters, Gas & Heat, 2020, 6 pages.

* cited by examiner

200

```
┌─────────────────────────────────────────────────────────┐
│ In response to determining that a first calibration instruction is │
│ received, or historical calibration times of gas pipelines exceeding a │ ～210
│ calibration time threshold is monitored, performing a first calibration │
│ on gas pipelines and pipeline valves on the gas pipelines to │
│ determine a first calibration result │
└─────────────────────────────────────────────────────────┘
                              ↓
┌─────────────────────────────────────────────────────────┐
│ Determining a flexible calibration batch based on sensing parameters │ ～220
│ and operation parameters │
└─────────────────────────────────────────────────────────┘
                              ↓
┌─────────────────────────────────────────────────────────┐
│ Generating, based on the flexible calibration batch and the first │
│ calibration instruction, a second calibration instruction, and │ ～230
│ performing a second calibration on the gas pipelines and the │
│ pipeline valves on the gas pipelines to obtain a second calibration │
│ result │
└─────────────────────────────────────────────────────────┘
                              ↓
┌─────────────────────────────────────────────────────────┐
│ Determining valves pending maintenance of the gas pipelines based │ ～240
│ on the first calibration result and the second calibration result │
└─────────────────────────────────────────────────────────┘
                              ↓
┌─────────────────────────────────────────────────────────┐
│ Determining work order information based on the valves pending │ ～250
│ maintenance │
└─────────────────────────────────────────────────────────┘
                              ↓
┌─────────────────────────────────────────────────────────┐
│ Determining a work order dispatch instruction based on the work │
│ order information and sending the work order dispatch instruction to │ ～260
│ a gas equipment maintenance object platform │
└─────────────────────────────────────────────────────────┘
                              ↓
┌─────────────────────────────────────────────────────────┐
│ Generating, prior to maintaining the valves pending maintenance, a │
│ parameter adjustment instruction and adjusting a working parameter │ ～270
│ of an auxiliary device operating in cooperation with the valves │
│ pending maintenance based on the parameter adjustment │
│ instruction │
└─────────────────────────────────────────────────────────┘
```

- 510 Determining a first alternative valve based on a feedback result of a smart gas government safety supervision management platform

- 520 Determining a second alternative valve based on a first calibration result, a second calibration result, and the first alternative valve

- 530 Determining a maintenance order of the second alternative valve based on the first calibration result and the second calibration result

- 540 Determining a third alternative valve based on the maintenance order of the second alternative valve

- 550 Determining valves pending maintenance based on the third alternative valve and the first alternative valve

FIG.5

INTERNET OF THINGS (IOT) SYSTEMS AND METHODS FOR PIPELINE VALVE CALIBRATION BASED ON SMART GAS SAFETY SUPER VISION

CROSS-REFERENCE TO RELATED APPLICATIONS

This application claims priority to Chinese Patent Application No. 202411977187.0, filed on Dec. 31, 2024, the entire contents of which are incorporated herein by reference.

TECHNICAL FIELD

The present disclosure generally relates to the field of gas management, and in particular to an Internet of Things (IoT) system and method for pipeline valve calibration based on smart gas safety supervision.

BACKGROUND

Valves on gas pipelines require repairing in case of failure and routine maintenance to reduce risk. The gas company usually carries out regular calibration of the gas pipelines of each region. When determining a repair and replacement strategy for each valve on the gas pipelines to reduce the risk, the impact on the daily transportation of gas in the gas pipelines needs to be minimized, and gas pipelines with a high frequency of failure need to be found in time.

In order to detect a failure situation of the gas pipelines, CN105741186A discloses a pipeline gas data processing method and system based on a user level, which obtains an actual gas usage situation by categorizing pipeline gas users, and grades different types of pipeline gas users according to corresponding preset gas management indexes, so as to determine the most appropriate differentiated pipeline gas data processing method based on different levels of gas users, thereby detecting and reducing the safety hazards of the gas pipelines. However, the foregoing method only considers the related data of the gas pipelines, and although the gas users are graded, more targeted inspection for the safety hazards of the gas pipelines and the valves based on the failure situation of the valves of the gas pipelines and the prioritization of valve repair is not performed.

Therefore, it is desirable to provide an IoT system and method for pipeline valve calibration based on smart gas safety supervision to reasonably set the repair and replacement strategies for the valves, thereby maintaining stable and safe transportation of gas.

SUMMARY

One or more embodiments of the present disclosure provide an Internet of Things (IoT) system for pipeline valve calibration based on smart gas safety supervision. The IoT system for pipeline valve calibration is capable of performing any one of a method for pipeline valve calibration based on smart gas safety supervision. The IoT system for pipeline valve calibration may comprise: a smart gas government safety supervision management platform, a smart gas government safety supervision sensor network platform, a smart gas government safety supervision object platform, a gas company sensor network platform, a gas equipment object platform, and a gas equipment maintenance object platform which are in communication connection in sequence. The smart gas government safety supervision management platform may include a gas company management platform. The smart gas government safety supervision management platform may be configured to generate a first calibration instruction and send the first calibration instruction to the gas company management platform. The gas company management platform may be configured to: in response to determining that the first calibration instruction is received, or historical calibration times of gas pipelines exceeding a calibration time threshold is monitored, perform a first calibration on the gas pipelines and pipeline valves on the gas pipelines to determine a first calibration result; determine a flexible calibration batch based on sensing parameters and operation parameters; generate, based on the flexible calibration batch and the first calibration instruction, a second calibration instruction, and perform a second calibration on the gas pipelines and the pipeline valves on the gas pipelines to obtain a second calibration result; determine valves pending maintenance of the gas pipelines based on the first calibration result and the second calibration result; determine work order information based on the valves pending maintenance; determine a work order dispatch instruction based on the work order information and send the work order dispatch instruction to the gas equipment maintenance object platform; and generate, prior to maintaining the valves pending maintenance, a parameter adjustment instruction and adjust a working parameter of an auxiliary device operating in cooperation with the valves pending maintenance based on the parameter adjustment instruction.

One or more embodiments of the present disclosure provide a method for pipeline valve calibration based on smart gas safety supervision. The method may comprise: in response to determining that a first calibration instruction is received, or historical calibration times of gas pipelines exceeding a calibration time threshold is monitored, performing a first calibration on the gas pipelines and pipeline valves on the gas pipelines to determine a first calibration result; determining a flexible calibration batch based on sensing parameters and operation parameters; generating, based on the flexible calibration batch and the first calibration instruction, a second calibration instruction, and performing a second calibration on the gas pipelines and the pipeline valves on the gas pipelines to obtain a second calibration result; determining valves pending maintenance of the gas pipelines based on the first calibration result and the second calibration result; determining work order information based on the valves pending maintenance; determining a work order dispatch instruction based on the work order information and send the work order dispatch instruction to a gas equipment maintenance object platform; and generating, prior to maintaining the valves pending maintenance, a parameter adjustment instruction and adjusting a working parameter of an auxiliary device operating in cooperation with the valves pending maintenance based on the parameter adjustment instruction.

One or more embodiments of the present disclosure provide a non-transitory computer-readable storage medium comprising computer instructions that, when read by a computer, may direct the computer to execute the method for pipeline valve calibration based on smart gas safety supervision.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, wherein:

FIG. 2 is a flowchart illustrating an exemplary method for pipeline valve calibration based on smart gas safety supervision according to some embodiments of the present disclosure;

FIG. 5 is a flowchart illustrating an exemplary process of determining valves pending maintenance according to some embodiments of the present disclosure.

DETAILED DESCRIPTION

Figure 1:
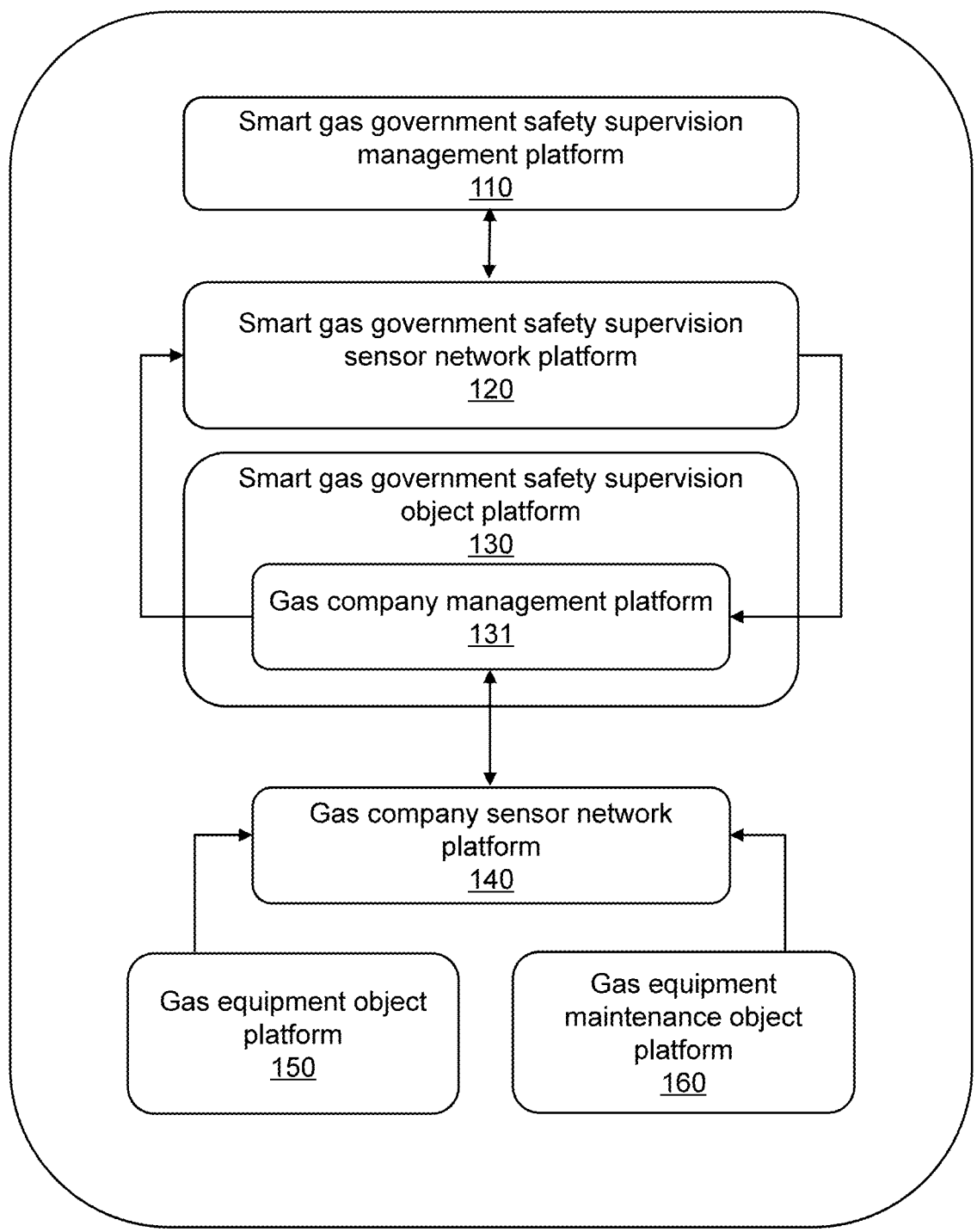
FIG. 1 is a schematic diagram illustrating a platform structure of an IoT system for pipeline valve calibration based on smart gas safety supervision according to some embodiments of the present disclosure.

In the following detailed description, numerous specific details are set forth by way of examples in order to provide a thorough understanding of the related disclosure. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

The terminology used herein is for the purposes of describing particular examples and embodiments only and is not intended to be limiting. As used herein, the singular forms "a," "an," and "the" may be intended to include the plural forms as well, unless the context clearly indicates otherwise.

FIG. 1 is a schematic diagram illustrating a platform structure of an IoT system for pipeline valve calibration based on smart gas safety supervision according to some embodiments of the present disclosure.

In some embodiments, the IoT system for pipeline valve calibration based on smart gas safety supervision may include a smart gas government safety supervision management platform 110, a smart gas government safety supervision sensor network platform 120, a smart gas government safety supervision object platform 130, a gas company management platform 131, a gas company sensor network platform 140, a gas equipment object platform 150, and a gas equipment maintenance object platform 160 which are in communication connection in sequence.

The smart gas government safety supervision management platform 110 is a comprehensive management platform for government management information. In some embodiments, the smart gas government safety supervision management platform may include a government supervision comprehensive database for query. The government supervision comprehensive database is a database that stores data related to the smart gas government safety supervision management platform 110. For example, the government supervision comprehensive database may store information related to gas business, information related to gas safety, etc.

In some embodiments, the smart gas government safety supervision management platform 110 may receive information related to the gas business and information related to gas safety, such as a usage information sequence of gas pipelines, sensing parameters and operation parameters of the gas pipelines, etc., and store the information related to the gas business and the information related to gas safety in the government supervision comprehensive database to facilitate supervision management of the gas business and the gas safety. More descriptions regarding the usage information sequence of the gas pipelines, the sensing parameters and operation parameters of the gas pipelines may be found in the present disclosure below.

In some embodiments, the smart gas government safety supervision management platform 110 may be configured to generate a first calibration instruction and send the first calibration instruction to the gas company management platform 131. More descriptions regarding the first calibration instruction may be found in the related descriptions below.

The smart gas government safety supervision sensor network platform 120 may be a functional platform for managing sensing communication. In some embodiments, the smart gas government safety supervision sensor network platform 120 may realize functions of perceptual information sensing communication and control information sensing communication. In some embodiments, the smart gas government safety supervision sensor network platform 120 may interact with the smart gas government safety supervision management platform 110 and the smart gas government safety supervision object platform 130.

The smart gas government safety supervision object platform 130 is a platform that generates government supervision information and controls the execution of the government supervision information.

In some embodiments, the gas company management platform 131 may interact with the smart gas government safety supervision sensor network platform 120. For example, the gas company management platform 131 may obtain historical data on the operation of the gas pipelines based on the smart gas government safety supervision sensor network platform 120, such as historical calibration times, and other data. In some embodiments, the gas company management platform 131 may be provided on a gas company management server. In some embodiments, the gas company management platform 131 may include a gas work order management center. More descriptions regarding the historical calibration times may be found in FIG. 2 and the related descriptions thereof.

The gas work order management center refers to a platform for comprehensive management of gas work orders. In some embodiments, the gas work order management center may be configured to determine work order information based on pipeline valves pending maintenance.

In some embodiments, the gas company management platform 131 and the smart gas government safety supervision management platform 110 may be in communication connection with the gas equipment maintenance object platform via a network.

More descriptions regarding the gas company management platform 131 may be found in FIG. 2 and the related descriptions thereof.

The gas company sensor network platform 140 is a platform for comprehensive management of sensing information of gas companies. In some embodiments, the gas company sensor network platform 140 may include a communication base station, a router, and a wireless WIF device. In some embodiments, the gas company sensor network platform 140 may realizes functions of perceptual information sensing communication and control information sensing communication. In some embodiments, the gas company sensor network platform 140 may perform data interaction with the gas company management platform 131, the gas equipment object platform 150, and the gas equipment maintenance object platform 160.

In some embodiments, the gas company sensor network platform 140 may include a plurality of communication sub-devices. In some embodiments, the gas company sensor network platform 140 may obtain sensing parameters and operation parameters of pipeline valves on the gas pipelines based on the gas equipment object platform 150.

In some embodiments, the gas equipment object platform 150 may be configured to obtain the sensing parameters and the operation parameters of the pipeline valves on the gas pipelines.

In some embodiments, the gas equipment object platform 150 may interact with the gas company management platform 131 through the gas company sensor network platform 140.

In some embodiments, the gas equipment object platform 150 may be configured to send the sensing parameters and the operation parameters of the pipeline valves on the gas pipeline to the gas company sensor network platform 140.

The gas equipment maintenance object platform 160 is a platform that receives work order information and performs maintenance and replacement of valves. In some embodiments, the gas equipment maintenance object platform 160 may interact with the gas company management platform 131 through the gas company sensor network platform 140. In some embodiments, the gas equipment maintenance object platform 160 may be provided in a terminal of gas operation and maintenance personnel.

In some embodiments, in response to determining that a work order dispatch instruction is received, the gas equipment maintenance object platform 160 may be configured to dispatch the work order information to a terminal of gas repair personnel for pipeline valve calibration.

In some embodiments, the pipeline valve calibration may include testing sealing performance, pressure capacity, and operation flexibility of the valves of the gas pipelines.

In some embodiments, the gas company sensor network platform 140 may perform data transmission with the gas equipment maintenance object platform 160 and the gas company management platform 131. For example, the gas equipment maintenance object platform 160 may obtain a maintenance record of a valve uploaded by the gas repair personnel and send the maintenance record to the gas company management platform 131 through the gas company sensor network platform 140.

In some embodiments, various functional platforms coordinate and operate systematically to form a closed loop of information operation based on the IoT system for pipeline valve calibration based on smart gas safety supervision, which realizes real-time detection of the valves of the gas pipelines and the informatization and intelligence of valve maintenance strategies or formulation thereof.

FIG. 2 is a flowchart illustrating an exemplary method for pipeline valve calibration based on smart gas safety supervision according to some embodiments of the present disclosure. As shown in FIG. 2, a process 200 may include the following operations. In some embodiments, the process 200 may be performed by the gas company management platform 131.

In 210, in response to determining that a first calibration instruction is received, or historical calibration times of gas pipelines exceeding a calibration time threshold is monitored, a first calibration may be performed on gas pipelines and pipeline valves on the gas pipelines to determine a first calibration result.

The first calibration instruction is a calibration instruction for performing the first calibration on the gas pipelines and the pipeline valves. The first calibration instruction may include a gas pipeline and a pipeline valve to be inspected. In some embodiments, a smart gas government safety supervision management platform may generate the corresponding first calibration instruction based on a government department's notification of a gas pipeline valve calibration.

The first calibration refers to a periodic calibration of the gas pipelines and pipeline valves. In some embodiments, the first calibration may include a pressure resistance test of the gas pipelines, a gas leakage test, a valve availability test, etc.

The first calibration result is a calibration result obtained after the first calibration. In some embodiments, the first calibration result may include a pressure resistance test result, a gas leakage test result, a valve availability test result, etc.

In some embodiments, the pressure resistance test result may include a stress distribution and a strain distribution of the gas pipelines; the gas leakage test result may include a leakage of the gas pipelines and a leakage point; and the valve availability test result may include whether the pipeline valves function properly.

In some embodiments, the calibration time threshold may be determined based on sensing parameters and operation parameters of the pipeline valves.

For example, the gas company management platform 131 may obtain the sensing parameters and the operation parameters of the pipeline valves within a preset time period to statistically obtain an average value of the sensing parameters and an average value of the operation parameters, and determine time periods of which the sensing parameters and the operation parameters respectively deviate from the average value of the sensing parameters and the average value of the operation parameters by an amplitude that exceeds a preset deviation magnitude as a sensing parameter fluctuation time period and an operation parameter fluctuation time period.

The gas company management platform 131 may determine corresponding periods between neighboring fluctuation time periods, and determine a period with the shortest interval between the fluctuation time periods as the calibration time threshold. Values of the preset time period and the preset deviation magnitude may be determined based on prior experience. Merely by way of example, the preset time period may be 1 min, and the preset deviation magnitude may be ±10% or ±20%.

More descriptions regarding the sensing parameters and the operation parameters may be found in the related descriptions of the operation 220.

In some embodiments, the calibration time threshold is determined based on the sensing parameters and the operation parameters of the pipeline valves, which guarantees that a timely calibration can be carried out when a fluctuation of the sensing parameters and the operation parameters of the pipeline valves occurs, so as to detect a faulty valve and carry out maintenance in time, thereby guaranteeing the safety of the gas pipelines and the stability of gas transportation.

In some embodiments, for a gas pipeline including a first alternative valve, the gas company management platform 131 may also adjust the calibration time threshold based on a feedback information frequency and a repair frequency of the gas pipeline.

The first alternative valve refers to a valve pending maintenance that is reported as faulty by a gas user. More descriptions regarding the first alternative valve may be found in FIG. 5 and the related descriptions thereof.

The feedback information refers to a feedback from the gas user to the government department regarding the failure of the gas pipelines and/or the pipeline valves. The feedback information frequency refers to a frequency at which the gas user sends the feedback information to the government department. In some embodiments, the gas company management platform 131 may obtain a time point of the feedback information of the gas user from the smart gas government safety supervision management platform to obtain time intervals between different feedback information, and obtain an average feedback interval after averaging.

The repair frequency refers to a frequency at which the gas repair personnel repair the gas pipelines and/or pipeline valves. In some embodiments, the gas company management platform 131 may obtain the feedback information frequency and the repair frequency of the gas pipelines through the government supervision comprehensive database.

In some embodiments, the gas company management platform 131 may determine the average feedback interval between different feedback information and the average repair interval of the gas pipelines based on the feedback information frequency and the repair frequency of the gas pipelines.

If both the average feedback interval and the average repair interval are greater than a preset interval duration, the gas company management platform 131 may determine an interval with the longest duration of the average feedback interval and the average maintenance interval as the calibration time threshold.

If both the average feedback interval and the average repair interval are less than the preset interval duration, the gas company management platform 131 may determine an interval with the shortest duration of the average feedback interval and the average maintenance interval as the calibration time threshold.

The preset interval duration may be determined based on prior experience. In some embodiments, the preset interval duration may be a first determined calibration time threshold.

In some embodiments of the present disclosure, if both the average feedback interval and the average repair interval are less than the preset interval duration, it indicates that the gas pipeline has a high frequency of failure, and in order to ensure the timely detection of the failure of the gas pipeline, the calibration time threshold can be appropriately reduced. If both the average feedback interval and the average repair interval are greater than the calibration time threshold of the gas pipeline, it indicates that the failure of the current pipeline is less likely to occur, and frequent calibration may lead to a waste of manpower and financial resources, and thus the calibration time threshold can be appropriately increased to save resources.

In 220, a flexible calibration batch may be determined based on sensing parameters and operation parameters.

The sensing parameters are parameters acquired by sensors on the pipeline valves. In some embodiments, the sensing parameters may include a force sensing parameter as the valve rotates and twists, and a stress state of a structural unit surrounding a valve (e.g., a pipeline, a fixed bracket, etc. near the valve). The gas company management platform 131 may acquire the force sensing parameter and the stress state through devices such as a force sensor, a piezoelectric sensor, and a strain gauge disposed on pipeline valves.

In some embodiments, since a single gas pipeline often has a plurality of pipeline valves, the single gas pipeline may correspond to a plurality sets of sensing parameters.

The operation parameters are index parameters during operation of the gas pipelines. In some embodiments, the operation parameters may include a pipeline material of a gas pipeline (e.g., steel, copper, and a composite material, etc.), a gas flow rate, and a gas pressure. The gas company management platform 131 may determine the gas flow rate and the gas pressure using a flow meter and a pressure gauge on the gas pipeline. The pipeline material may be obtained by querying record data during mounting of the gas pipeline.

The flexible calibration batch is a batch for calibrating risky pipeline valves with potential safety hazards. The flexible calibration batch may include a gas pipeline on which a second calibration is performed, a plurality of pipeline valves within the corresponding gas pipeline. In some embodiments, the gas company management platform 131 may determine the flexible calibration batch in various ways. For example, for one of the gas pipelines, if the gas flow rate of the gas pipeline is lower than a preset flow threshold or the gas pressure is higher than a preset pressure threshold, it indicates a possible anomaly and risky pipeline valves within that gas pipeline valve need to be determined for additional inspection.

For one of the gas pipelines, the gas company management platform 131 may determine the flexible calibration batch by querying a first vector database based on the sensing parameters and the operation parameters.

For one of the gas pipelines, the gas company management platform 131 may construct a vector to be matched for the gas pipeline based on the operation parameters and several sets of sensing parameters as elements. The gas company management platform 131 may conduct a search in a vector database based on the vector to be matched to obtain reference vectors of which vector distances from the vector to be matched are less than a distance threshold, and determine labels corresponding to the reference vectors as the risky pipeline valves of the current gas pipeline. The risky pipeline valves of a plurality of gas pipelines may be determined as the flexible calibration batch.

The vector database may store a plurality of reference vectors and corresponding labels. The reference vectors may be constructed based on historical operation parameters of the gas pipelines, and historical sensing parameters of the pipeline valves. The labels of the reference vectors may include whether historical risky pipeline valves are abnormal (e.g., there is a failure or a high probability of failure in a short time period in the future). The gas company management platform 131 may determine pipeline valves that are actually determined as having an anomaly, or failing in a short time period in the future of the pipeline valves corresponding to feature vectors in a calibration and maintenance record of historical gas pipelines as the historical risky pipeline valves and use as the labels of the reference vectors.

In some embodiments, the gas company management platform 131 may determine the flexible calibration batch based on a usage information sequence, the sensing parameters, and the operation parameters. More descriptions may be found in FIG. 3 and the related descriptions thereof.

In some embodiments, the gas company management platform 131 may adjust the flexible calibration batch by determining gas pipeline sand pipeline valves that need the second calibration through a batch determination model. More descriptions may be found in FIG. 4 and the related descriptions thereof.

In 230, a second calibration instruction may be generated based on the flexible calibration batch and the first calibration instruction, and a second calibration may be performed on the gas pipelines and the pipeline valves on the gas pipelines to obtain a second calibration result.

The second calibration instruction is a calibration instruction for the gas company to perform the second calibration on the gas pipelines and the pipeline valves that are determined to be at risk. In some embodiments, the composition of the second calibration instruction may be the same as the composition of the first calibration instruction, which may be found in the related descriptions of the first calibration instruction above.

The second calibration is an additional calibration performed by the gas company on the gas pipelines and the pipeline valves determined to be at risk to eliminate hidden hazards.

The second calibration result is a calibration result obtained after the second checksum. The composition of the second calibration result may be the same as the composition of the first calibration result, which may be found in the related descriptions above.

The historical calibration time is a time period in which the first calibration is performed on the gas pipelines last time. The calibration time threshold is a maximum allowable interval duration between two inspection tests required for a gas pipeline. The calibration time thresholds corresponding to a plurality of gas pipelines may form a calibration time threshold set. More descriptions regarding the first calibration may be found below.

In some embodiments, the gas company management platform 131 may determine the calibration time threshold in various ways. For example, the gas company management platform 131 may determine the calibration time threshold by querying a first preset table based on the pipeline material, years of usage, and a legal lifespan of the gas pipeline. The gas company management platform 131 may construct the first preset table based on historical pipeline materials, historical years of usage, historical legal lifespans, and historical calibration time thresholds. The first preset table may include a correspondence between the different historical gas pipeline materials, the historical years of usage, the historical legal lifespans, and the historical calibration time thresholds. In some embodiments, the calibration time threshold for the gas pipeline may be appropriately shortened when the gas pipeline has a thinner wall thickness and a more brittle material.

In some embodiments, the gas company management platform 131 may exclude pipeline valves that are included in the first calibration instruction from the flexible calibration batch. The risky pipeline valves remaining after the exclusion may be determined as pipeline valves that need inspection in the second calibration instruction.

In 240, valves pending maintenance of the gas pipelines may be determined based on the first calibration result and the second calibration result.

In some embodiments, the gas company management platform 131 may determine scores of the first calibration result and the second calibration result based on whether the pressure resistance test result satisfies a pipeline pressure standard, whether the gas leakage test result satisfies a pipeline sealing standard, and whether the valve availability test result is available based on the first calibration result and the second calibration result.

For example, if the pressure resistance test result, the gas leakage test result, and the valve availability test result are all qualified, the core is 3, and if only one of the pressure resistance test result, the gas leakage test result, and the valve availability test result is qualified, the score is 1. The pipeline pressure standard and the pipeline sealing standard may be determined based on relevant laws and regulations and mandatory inspection standards.

In some embodiments, the gas company management platform 131 may determine a pipeline valve of which a score in the first calibration result is less than a first preset threshold and a pipeline valve of which a score in the second calibration result is less than a second preset threshold as the valves pending maintenance.

In some embodiments, since the pipeline valves in the first calibration result are periodically calibrated and the sensing parameters and the operation parameters of the pipeline valves are not considered, a real-time change of the pipeline valves is difficult to obtain in time. Accordingly, a qualification standard of the first calibration result may be stricter than a qualification standard of the second calibration result to ensure that the pipeline valves in the first calibration result do not fail within a short time period. Therefore, the first preset threshold may be greater than the second preset threshold.

In some embodiments, the gas company management platform 131 may determine the valves pending maintenance based on a third alternative valve and the first alternative valve. More descriptions may be found in FIG. 5 and the related descriptions thereof.

In 250, work order information may be determined based on the valves pending maintenance.

The work order information is record information used to perform pipeline valve maintenance. In some embodiments, the work order information may include gas pipelines to which the valves pending maintenance belong, positions of the valves pending maintenance, and models of the valves pending maintenance.

In some embodiments, the gas company management platform 131 may determine the work order information in various ways. For example, the gas company management platform 131 may determine the work order information by querying a work order information preset table. The gas company management platform 131 may construct the work order information preset table based on historical valves pending maintenance, history gas pipelines to which the valves pending maintenance belong, history positions of the valves pending maintenance, and historical models of the valves pending maintenance. The work order information preset table may include a correspondence between the different historical valves pending maintenance, the history gas pipelines to which the valves pending maintenance belong, the history positions of the valves pending maintenance, and the historical models of the valves pending maintenance. The processor may determine current work order information by querying the work order information preset table based on current valves pending maintenance.

In some embodiments, the gas company management platform 131 may obtain, based on the government supervision comprehensive database, a mounting record of the gas pipelines and the pipeline valves, and thus obtain information such as the gas pipelines to which the valves pending maintenance belong and the models of the valves pending maintenance. Information such as the positions of the valves pending maintenance may be obtained by positioning modules mounted on the valves pending maintenance.

In 260, a work order dispatch instruction may be determined based on the work order information and sent to a gas equipment maintenance object platform.

The work order dispatch instruction is an instruction for dispatching a work order to the related gas repair personnel. In some embodiments, the work order dispatch instruction may include the gas pipelines to which the valves pending maintenance belong, the positions of the valves pending maintenance, the models of the valves pending maintenance, and a list of personnel to be dispatched.

In some embodiments, the gas company management platform 131 may determine the list of personnel to be dispatched in various ways. For example, the gas company management platform 131 may determine the list of personnel to be dispatched by selecting the closest required count of gas maintenance personnel in sequence with on the valves pending maintenance as centers.

In 270, a parameter adjustment instruction may be generated prior to maintaining the valves pending maintenance, and a working parameter of an auxiliary device operating in cooperation with the valves pending maintenance may be adjusted based on the parameter adjustment instruction.

The parameter adjustment instruction is an instruction for adjusting the working parameter of the auxiliary device. In some embodiments, in order to ensure that the valves pending maintenance are able to operate normally and reliably during a window period before maintenance to avoid expansion of the potential hazards, the gas company management platform 131 may appropriately increase monitoring frequencies of the corresponding sensors through the parameter adjustment instruction.

In some embodiments, the auxiliary device operating in conjunction with the valves pending maintenance may include devices such as a force sensor, a piezoelectric sensor, and a strain gauge disposed on the valves pending maintenance. The working parameter of the auxiliary device may include a frequency at which the auxiliary device performs a monitoring scan.

In some embodiments, the gas company management platform 131 may determine, based on the first calibration result and the second calibration result, a stress distribution difference and a strain distribution difference of the valves pending maintenance. The working parameter of the auxiliary device operating in conjunction with the valves pending maintenance may be positively correlated with the stress distribution difference and the strain distribution difference.

For example, the larger the stress distribution difference and the strain distribution difference of the valves pending maintenance, the more severe the damage to the valves, and the higher the safety risk associated with continued use of the valves. Accordingly, the gas company management platform 131 may increase parameters such as a detection frequency of the corresponding auxiliary device to ensure timely monitoring.

The stress distribution difference may be a difference between the valves pending maintenance and a standard stress distribution, and the strain distribution difference may be a difference between the valves pending maintenance and a standard strain distribution. The standard stress distribution and the standard strain distribution may be determined based on prior experience.

In some embodiments of the present disclosure, the valves pending maintenance of the gas pipelines are determined based on the first calibration result and the second calibration result, and the working parameter of the auxiliary device operating in conjunction with the valves pending maintenance is adjusted, such that the valves pending maintenance that have anomalies and potential hazards can be quickly and accurately determined from a plurality of pipeline valves in a gas pipeline network, and the monitoring frequency of the valves is increased prior to the maintenance of the valves, thereby ensuring the safety of gas usage, and preventing the expansion of the potential hazards due to untimely monitoring.

Figure 3:
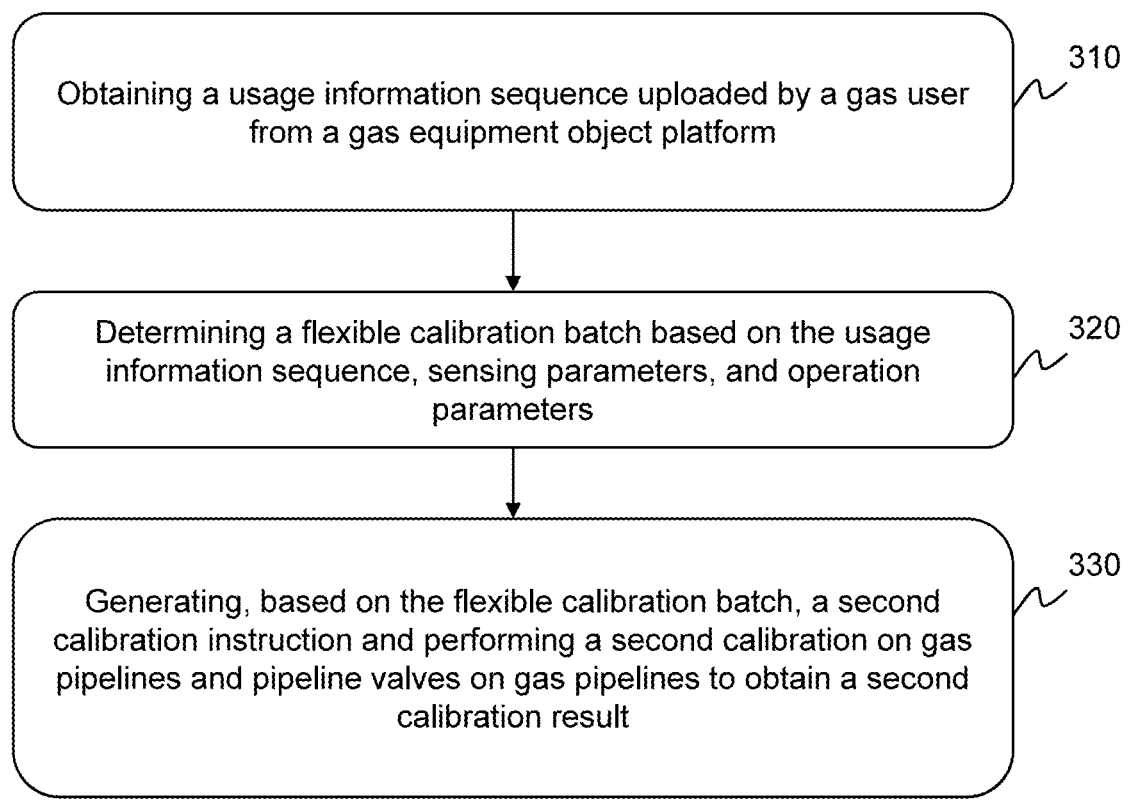
FIG. 3 is a flowchart illustrating an exemplary process of obtaining a second calibration result according to some embodiments of the present disclosure.

FIG. 3 is a flowchart illustrating an exemplary process of obtaining a second calibration result according to some embodiments of the present disclosure. As shown in FIG. 3, a process 300 may include the following operations. In some embodiments, the process 300 may be performed by the gas company management platform 131.

In 310, a usage information sequence uploaded by a gas user may be obtained from a gas equipment object platform.

The usage information sequence is an information sequence used to represent a change in a gas consumption over time. One gas pipeline may correspond to one usage information sequence. In some embodiments, the usage information sequence may include gas consumptions during different time periods, for example represented as $[(t_1, D_1), (t_2, D_2), \ldots, (t_n, D_n)]$, wherein $t_n$ denotes a time period, and $D_n$ denotes a gas consumption during the time period.

In some embodiments, the gas equipment object platform may determine the gas consumptions during different time periods through a flow meter and a pressure gauge disposed in an indoor circumference of the gas user, and generate the usage information sequence.

In 320, a flexible calibration batch may be determined based on the usage information sequence, sensing parameters, and operation parameters.

In some embodiments, the gas company management platform 131 may determine a delivery flow rate and a gas consumption based on the usage information sequence and the operation parameters of the gas pipelines.

For example, if a difference between the delivery flow rate and the gas consumption of the gas pipelines at a corresponding time period is greater than a preset difference threshold, it indicates that a leakage of the gas pipelines may occur; if the difference between the delivery flow rate and the gas consumption of the gas pipelines at the corresponding time period is less than the preset difference threshold, but a delivery pressure of the time period is significantly greater than a normal value, it indicates that a blockage of the gas pipelines may occur.

The gas company management platform 131 may determine a gas pipeline having a gas leakage or a pipeline blockage as a gas pipeline that requires the second calibration. A condition for determining the gas leakage and a condition for determining the pipeline blockage may be determined based on prior experience.

In some embodiments, for each gas pipeline that requires the second calibration, the gas company management platform 131 may determine, based on the operation parameters and the sensing parameters, the risky pipeline valves on the gas pipeline by querying the first vector database, so as to determine the flexible calibration batch. More descriptions may be found in FIG. 2 and the related descriptions thereof.

In 330, a second calibration instruction may be generated based on the flexible calibration batch, a second calibration may be performed on gas pipelines and pipeline valves on the gas pipelines to obtain a second calibration result.

In some embodiments, the gas company management platform 131 may exclude pipeline valves that are included in the first calibration instruction from the flexible calibration batch. The remaining risky pipeline valves after the exclusion may be determined as pipeline valves to be inspected in the second calibration instruction. More descriptions may be found in FIG. 2 and the related descriptions thereof.

In some embodiments of the present disclosure, by comparing the difference between the delivery flow rate and the gas consumption, whether the leakage of gas or the blockage of the gas pipeline can be determined, which helps to determine the flexible calibration batch and perform the second calibration.

Figure 4:
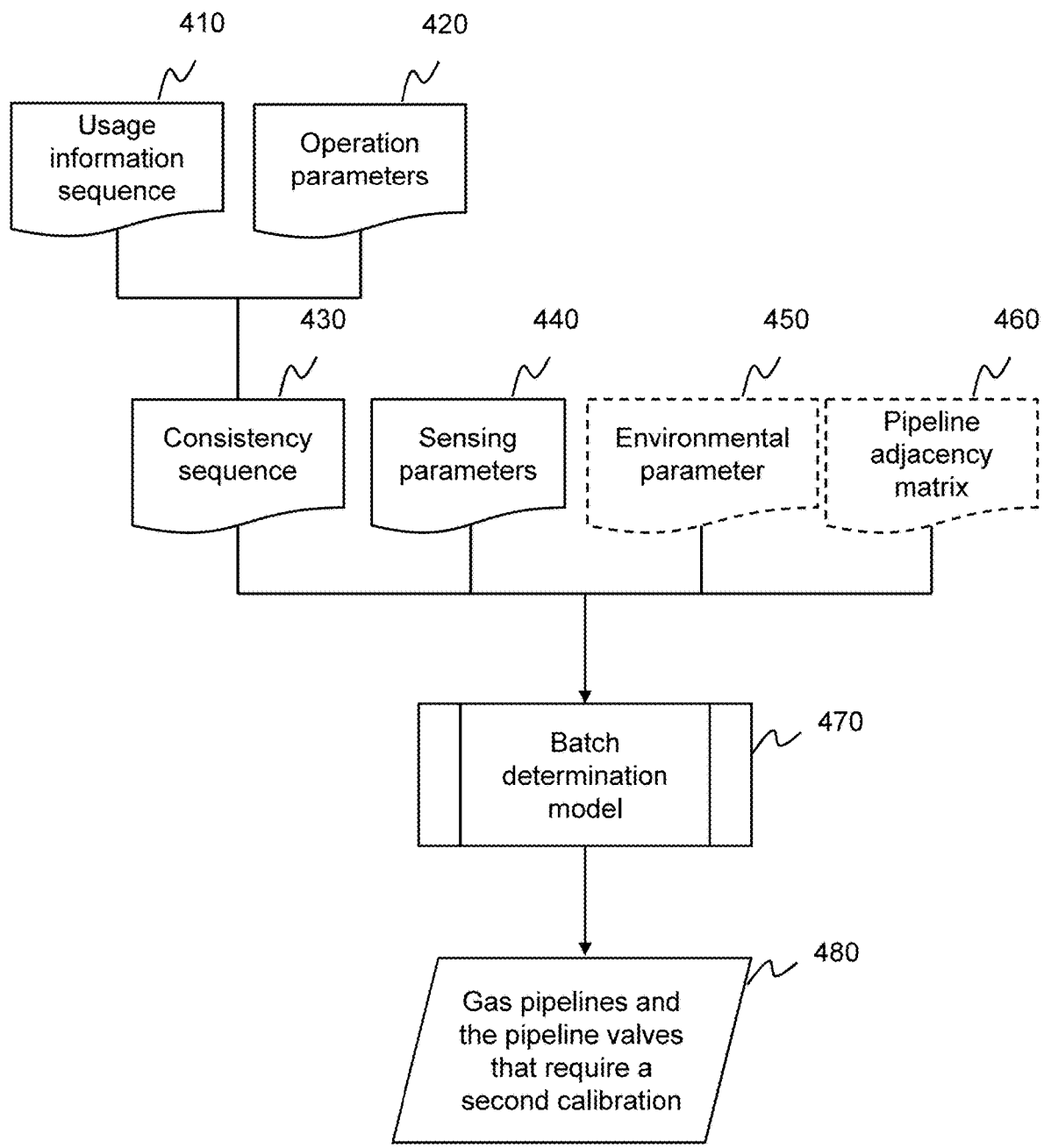
FIG. 4 is a schematic diagram illustrating an exemplary batch determination model according to some embodiments of the present disclosure.

FIG. 4 is a schematic diagram illustrating an exemplary batch determination model according to some embodiments of the present disclosure.

In some embodiments, for one of gas pipelines, the gas company management platform 131 may determine, based on a usage information sequence 410 and operation parameters 420, a consistency sequence 430 of the usage information sequence and the operation parameters.

A consistency may reflect a data matching degree of a gas consumption with a delivery flow rate of the gas pipeline. In some embodiments, consistencies of a certain gas pipeline during different time periods may be represented by the consistency sequence 430, such as [(t$_1$, G$_1$), (t$_2$, G$_2$), . . . , (t$_n$, G$_n$)], wherein to denotes the time period and G$_n$ denotes the consistency during the time period. In some embodiments, the time periods t$_1$ to t$_n$ in the consistency sequence may be the same as the time periods t$_1$ to t$_n$ in the usage information sequence.

In some embodiments, the consistency may be determined based on the gas consumptions and the delivery flow rates during different time periods. For example, the consistency may be obtained by the following equation (1):

$$G_n = \frac{2 \times (D_n - E_n)}{D_n + E_n} \quad (1)$$

where G$_n$ denotes the consistency during the time period t$_n$, D$_n$ denotes the gas consumption during the time period t$_n$, and E$_n$ denotes the delivery flow rate during the time period t$_n$.

In some embodiments, the gas company management platform 131 may determine, based on the consistency sequence 430 and the sensing parameters 440, the gas pipelines and pipeline valves 480 that require the second calibration through a batch determination model 470, and adjust the flexible calibration batch.

The batch determination model 470 is a prediction model for determining the flexible calibration batch. In some embodiments, the batch determination model may be a machine learning model, such as any one of a deep neural networks (DNN) model or other customized model structure, or any combination thereof.

In some embodiments, an input of the batch determination model 470 may include the consistency sequence and the sensing parameters of a plurality of gas pipeline, and an output of the batch determination model 470 may include the gas pipelines and the pipeline valves that require the second calibration.

In some embodiments, the input of the batch determination model 470 may further include an environmental parameter 450.

The environmental parameter 450 is a parameter reflecting environment information in the vicinity of a sample gas pipeline. In some embodiments, the environmental parameter 450 may include a temperature sequence and a humidity sequence. Different gas pipeline may correspond to different temperature sequences and humidity sequences. The temperature sequence and the humidity sequence may include temperatures and humidities during different time periods. The composition of the temperature sequence and the humidity sequence may be similar to the composition of the usage information sequence, which may be found in the related descriptions of the usage information sequence above.

In some embodiments, the gas company management platform 131 may determine the environmental parameter 450 in various ways. For example, the gas company management platform 131 may determine acquired data (e.g., information on moisture content, gas composition, etc.) as the environmental parameter through devices such as a gas detectors disposed in a gas corridor, a geo-detector buried near the gas pipelines, etc.

In some embodiments, the gas company management platform 131 may obtain at least one of temperature data or humidity data during different time periods based on at least one of thermometers or hygrometers disposed on the gas pipeline to obtain at least one of the temperature sequence or the humidity sequence.

In some embodiments, by inputting at least one of the temperature sequence or the humidity sequence into the batch determination model, the input data dimension of the batch determination model can be enhanced, which helps the batch determination model to consider the effects of different temperatures and humidities on the gas pipelines and the pipeline valves, thereby enhancing the reliability and accuracy of determination results.

In some embodiments, the input of the batch determination model 470 may include a pipeline adjacency matrix 460.

The pipeline adjacency matrix 460 is a matrix that represents a connection relationship between the gas pipelines. In some embodiments, the pipeline adjacency matrix may include at least one vertex and at least one edge. In some embodiments the at least one vertex may be categorized as bifurcation vertexes and valve vertexes. The bifurcation vertexes may correspond to bifurcations between the gas pipelines. The valve vertexes may correspond to the pipeline valves between the gas pipelines. Vertex attributes of the bifurcation vertexes and the valve vertexes may include position coordinates of the bifurcations and the pipeline valves.

In some embodiments, the at least one edge represents a connection relationship between the at least one vertex. A distance between two vertexes in the pipeline adjacency matrix may reflect a path distance between the two vertexes. When there is a pipeline connecting the two vertexes, the two vertexes may be connected with an edge.

In some embodiments, the gas company management platform 131 may obtain a construction record of the gas pipelines during construction based on the government supervision comprehensive database, obtain the position coordinates of the pipeline valves and the pipeline bifurcations, and the connection relationship between the gas pipelines, and then construct the pipeline adjacency matrix 460.

In some embodiments of the present disclosure, by inputting the pipeline adjacency matrix 460 into the batch determination model 470, the input data dimension of the batch determination model can be enhanced, which helps the batch determination model to consider the effects of the connection relationship of different gas pipelines, thereby enhancing the reliability and accuracy of the determination results.

In some embodiments, the gas company management platform 131 may obtain the batch determination model 470 by training based on first training samples and first labels. In some embodiments, the first training samples may include a sample consistency sequence, sample sensing parameters, sample environmental parameters, and sample pipeline adjacency matrixes. In some embodiments, the first training samples may further include the sample environmental parameters and the sample pipeline adjacency matrixes. The first labels may include sample gas pipelines and sample pipeline valves corresponding to the first training samples that need the second calibration.

In some embodiments, the first training samples may be obtained based on historical data, and the first labels corresponding to the first training samples may be obtained from historical failure situations of historical gas pipelines. For example, the gas company management platform 131 may determine historical gas pipelines and historical pipeline valves at a first historical time point in historical data as the sample gas pipelines and the sample pipeline valves. The gas company management platform 131 may obtain historical temperature/humidity information of the historical gas pipelines to construct the sample environmental parameters. The gas company management platform 131 may obtain, based on the government supervision comprehensive database, historical position coordinates of the pipeline valves and the pipeline bifurcations at the first historical point in time, and a historical connection relationship between the gas pipelines, so as to determine the sample pipeline adjacency matrixes.

In some embodiments, the gas company management platform 131 may obtain the history failure situations of the historical gas pipelines and the historical pipeline valves. If the historical gas pipelines and the historical pipeline valves have a failure at a second historical time point, the labels may be 0; if the historical gas pipelines and the historical pipeline valves do not have the failure at the second historical time point, the labels may be 1. The first historical time point may be earlier than the second historical time point.

In some embodiments, the gas company management platform 131 may perform training based on the first training samples and the first labels in various ways. For example, the gas company management platform 131 may select one or more first training samples from a training dataset, input the one or more first training samples into an initial batch determination model to obtain one or more model prediction outputs corresponding to the one or more first training samples; calculating a value of a loss function by substituting the model prediction outputs corresponding to the one or more training samples and the label of the one or more first training samples into a formula of a predefined loss function; and perform a reverse update of model parameters of the initial batch determination model based on the value of the loss function using various feasible manners (e.g., update based on gradient descent). When an iteration end condition is satisfied, the iteration may be ended, and a trained batch determination model may be obtained. The iteration e d condition may be that the loss function converges, a count of iterations reaches a threshold, etc.

In some embodiments, after a preset count of trainings, the gas company management platform 131 may determine a learning rate of the batch determination model based on an attenuation factor. The preset count of trainings may be determined based on a pipeline valve ratio.

The learning rate is a parameter used to determine an update step size in the training process of the batch determination model. The attenuation factor is a factor used to reduce the learning rate. In some embodiments, a plurality of iterative updates are often required during the training of the initial batch determination model. In this way, the step size of the loss function may be adjusted using the learning rate.

In some embodiments, when the learning rate is large, it allows the model to respond quickly to the training data to speed up training, but may cause the model to miss an optimal solution and fail to converge. When the learning rate is small, it allows the loss function to vary more gently, which helps to improve the stability and generalization of the model, but may slow down the training speed and cause the loss function to fall into a local optimum. Therefore, the gas company management platform 131 may control the training speed and the convergence range of the model by updating the learning rate of the batch determination model.

In some embodiments, for the initial batch determination model, the gas company management platform 131 may determine a product of the attenuation factor and the learning rate, after the preset count of trainings, as an updated learning rate. A value of the attenuation factor may be within a range of 0-1. The value of the attenuation factor may be determined based on prior experience. The preset count of trainings may be related to the pipeline valve ratio.

The pipeline valve ratio may reflect a count of sample pipeline valves in the first training samples. In some embodiments of the present disclosure, the gas company management platform 131 may classify the first training samples as a lower level, a medium level, or a higher level based on the count of sample pipeline valves. Each level may correspond to a different count of preset trainings. The count of preset trainings corresponding to different levels may be preset based on prior experience.

In some embodiments, to ensure that the model is able to fully learn data features in the training samples before the end of the training, the count of preset trainings of the higher level > the count of preset trainings of the medium level > the count of preset trainings of the lower level, thereby ensuring that the learning rate of the first training samples with a high pipeline valve ratio attenuates later.

In some embodiments of the present disclosure, the larger the count of pipeline valves, the more complex the entire gas pipeline network, and the larger the amount of information in the training samples. The use of a relatively small learning rate tends to be time consuming, while the use of a relatively large learning rate leads to a decrease in the generalization of the model. Therefore, in order to ensure a balance between the training accuracy and the training duration of the model, a relatively high learning rate may be used first to improve the training efficiency, and the learning rate may be moderately reduced when the preset count of trainings are reached to improve the training accuracy of the model, thereby helping the model converge better.

In some embodiments, the gas company management platform 131 may obtain the gas pipelines and the pipeline valves 480 requiring the second calibration output by the batch determination model, and add gas pipeline and/or pipeline valves which are not included in the flexible calibration batch to the flexible calibration batch to adjust the flexible calibration batch.

In some embodiments of the present disclosure, the gas pipelines and the pipeline valves that require the second calibration may be determined through the machine learning model, which can make full use of the data processing capability and analytical capability of the machine learning model to quickly and accurately obtain the gas pipelines and pipeline valve that require the second calibration, thereby saving labor and material resources.

FIG. 5 is a flowchart illustrating an exemplary process of determining valves pending maintenance according to some embodiments of the present disclosure. As shown in FIG. 5, a process 500 may include the following operations. In some embodiments, the process 500 may be performed by gas company management platform 131.

In some embodiments, the valves pending maintenance may include a first alternative valve and a third alternative valve. The third alternative valve is a second alternative valve of which a maintenance order satisfies a preset sorting condition. A maintenance priority of the first alternative valve may be higher than a maintenance priority of the second alternative valve. More descriptions regarding the first alternative valve may be found in FIG. 2 and the related descriptions thereof.

In 510, a first alternative valve may be determined based on a feedback result of a smart gas government safety supervision management platform.

In some embodiments, the feedback result of the smart gas government safety supervision management platform may include a damaged valve and/or a valve that needs to be repaired. In some embodiments, the gas company management platform may obtain the feedback result through the smart gas government safety supervision management platform.

In some embodiments, the gas company management platform may determine the first alternative valve based on the feedback result. For example, the gas company management platform may read information related to the damaged valve and/or the valve that needs repair in the feedback result, etc.

In 520, a second alternative valve may be determined based on a first calibration result, a second calibration result, and the first alternative valve.

The second alternative valve is a valve that is tested or predicted to fail. In some embodiments of the present disclosure, a maintenance priority of the second alternative valve may be lower than the maintenance priority of the first alternative valve.

In some embodiments, the gas company management platform may determine the second alternative valve based on the first calibration result, the second calibration result, and the first alternative valve in various ways. For example, the gas company management platform may predict the second alternative valve based on the first calibration result and the second calibration result through a faulty valve prediction model.

The faulty valve prediction model is a model for predicting the second alternative valve. In some embodiments, the faulty valve prediction model may be a machine learning model, etc., such as a deep neural network, etc.

In some embodiments, an input of the faulty valve prediction model may include the first calibration result of the pipeline valves in a plurality of gas pipelines and the second calibration result of the pipeline valves in the plurality of gas pipelines.

In some embodiments, an output of the faulty valve prediction model may include the second alternative valve, etc.

In some embodiments, the input of the faulty valve prediction model may further include the first alternative valve and a local pipeline adjacency matrix.

The local pipeline adjacency matrix is an adjacency matrix that characterizes a position relationship of the first alternative valve to other valves. More descriptions regarding the adjacency matrix may be found in the related descriptions of FIG. 4.

In some embodiments, both rows and columns of the local pipeline adjacency matrix may correspond to individual valves (i.e., vertexes) within a region in which the first alternative valve is located, and elements of the local pipeline adjacency matrix may correspond to whether there is a connection relationship between the valves in the rows and the columns. For example, an element of an mth row and an nth column (or an element of an nth row and an mth column) of the local pipeline adjacency matrix may represent a connection relationship between an mth valve and an nth valve. If the element of the mth row and the nth column (or the element of the nth row and the mth column) of the local pipeline adjacency matrix has a non-zero value, it means that there is a connection relationship between the mth valve and the nth value. If the element of the mth row and the nth column (or the element of the nth row and the mth column) of the local pipeline adjacency matrix has a zero value, it means that there is no connection relationship between the mth valve and the nth value.

In some embodiments, the gas company management platform may construct the local pipeline adjacency matrix of the first alternative valve based on the first alternative valve and remaining valves in a region in which the first alternative valve is located. For example, in the local pipeline adjacency matrix, the gas company management platform may set elements corresponding to the valves having the connection relationship to 1 (or some other non-zero values), or set elements corresponding to the valves having no connection relationship to 0.

The second alternative valve may be predicted through the connection relationship between the first alternative valve and the remaining valves, such that the model can simultaneously predict the valves around the first alternative valve, thereby improving the accuracy of the faulty valve prediction model.

In some embodiments, the gas company management platform may obtain a faulty valve training dataset. The faulty valve training dataset may include a plurality of second training samples, and a plurality of second labels corresponding to the plurality of second training samples.

In some embodiments, the gas company management platform may obtain the faulty valve training dataset, in various ways. In some embodiments, the gas company management platform may determine the faulty valve training dataset based on the first calibration result and the second calibration result in the historical data. For example, the gas company management platform may set a set of first calibration results and a set of second calibration results in historical maintenance records as a set of second training samples, and set actual second alternative valves corresponding to the set of second training samples as the second labels of the set of second training samples by automatic labeling or manual labeling. The actual second alternative valves may include second alternative valves corresponding to each set of second training samples in the historical maintenance records.

In some embodiments, the gas company management platform may determine the faulty valve training dataset based on the first alternative valve and the corresponding local pipeline adjacency matrix in the historical data. For example, the gas company management platform may set a set of first alternative valves and the corresponding local pipeline adjacency matrixes in the historical maintenance records as a set of second training samples, and set the actual second alternative valves corresponding to the set of second training samples as the second labels of the set of second training samples by automatic labeling or manual labeling.

In some embodiments, the gas company management platform may train the faulty valve prediction model through a plurality of iterations. At least one of the plurality of iterations may include: the gas company management platform selecting, from the faulty valve training dataset, one or more sets of second training samples, and inputting one or more sets of second training samples into the faulty valve prediction model to obtain model prediction outputs corresponding to the one or more sets of second training samples; and the gas company management platform calculating a value of a loss function by substituting the model prediction outputs corresponding to the one or more sets of second training samples, and the one or more sets of second labels corresponding to the one or more sets of second training samples into a formula of the predefined loss function.

The gas company management platform may perform a reverse update of model parameters of the faulty valve prediction model based on an optimization algorithm, such as gradient descent according to the value of the loss function. When an iteration end condition is satisfied (e.g., the loss function converges, a count of iterations reaches a preset iteration threshold, etc.), the gas company management platform may end the iterations and obtain a trained faulty valve prediction model.

The second alternative valve may be predicted through the faulty valve prediction model, which allows for more accurate determination of valves that need to be prioritized for replacement or maintenance; by using the connection relationship between the first alternative valve and the remaining valves as the input of the faulty valve prediction model, it allows the faulty valve prediction model to use contextual information surrounding the first alternative valve as a reference factor for prediction, which in turn helps the faulty valve prediction model to more accurately determine potential faulty valves, thereby improving the prediction accuracy.

In 530, a maintenance order of the second alternative valve may be determined based on the first calibration result and the second calibration result.

In some embodiments, the gas company management platform may determine the maintenance order of the second alternative valve based on the first calibration result and the second calibration result through a second vector database.

The second vector database refers to a database for storing the maintenance order of the second alternative valve. In some embodiments, the second vector database may store a mapping relationship between the maintenance order of the second alternative valve and a calibration result (e.g., the first calibration result and the second calibration result, etc.). For example, feature vectors of the second vector database may include the first calibration result and the second calibration result, and labels of the second vector database may include the maintenance order of the second alternative valve corresponding to the first calibration result and the second calibration result. In some embodiments, the labels of the second vector database may be preset based on manual experience.

In some embodiments of the present disclosure, the gas company management platform may construct the second vector database based on historical maintenance results in various ways. For example, the gas company management platform may use the maintenance order of the second alternative valve corresponding to a historical optimal maintenance result as the label of the second vector database, and store the label of the second vector database in association with the corresponding feature vector (e.g., a feature vector corresponding to the historical optimal maintenance result, etc.) in the second vector database.

In some embodiments, the optimal maintenance result may be determined based on a feedback of a gas user. In some embodiments, the optimal maintenance results may include at least one of no secondary failure event at the time of the repair, an optimal post-repair feedback from the gas user, a lowest frequency of valve failure again, or the like.

In some embodiments, the gas company management platform may determine the maintenance order of the second alternative valve through the second vector database. The second vector database is a database for storing, indexing, and querying vectors. For example, the gas company management platform may retrieve an index matching a vector formed by the first calibration result and the second calibration result in the second vector database, and if there is a matching index, use a label corresponding to the retrieved index as the maintenance order of the second alternative valve to be fed back to the gas company management platform.

In 540, a third alternative valve may be determined based on the maintenance order of the second alternative valve.

The third alternative valve is a second alternative valve to be prioritized for maintenance if the maintenance order satisfies the preset sorting condition. In some embodiments, the preset sorting condition may be determined based on manual experience. In some embodiments, the preset sorting condition may include the maintenance order of the second alternative valve being in the top N. In some embodiments, N may be an integer greater than 0, and the value of N may be determined based on manual experience.

In some embodiments, the gas company management platform may determine the third alternative valve based on the maintenance order of the second alternative valve in various ways. For example, the gas company management platform may move the maintenance order of the first N valves in the maintenance order of the second alternative valve to a later order of the first alternative valve, and set the first N valves in the maintenance order of the second alternative valve and the first alternative valve as the third alternative valves.

In some embodiments, N may be correlated with a consistency sequence of a gas pipeline corresponding to the second alternative valve. For example, the gas company management platform may set a count of gas pipelines of which an average value of the consistency sequences is less than a consistency threshold to the value of N. In some embodiments, the consistency threshold may be determined based on manual experience. In some embodiments, the average value of the consistency sequences may include an average value of consistency sequences during one or more historical time periods. More descriptions regarding the consistency sequence may be found in the related descriptions above.

The valves pending maintenance may be determined through the average value of the consistency sequences, which ensures that the valves of the gas pipelines with a relatively high maintenance frequency can be prioritized to be repaired or maintained, and the valves with a relatively severe failure can be repaired in time, which in turn reduces abnormal delivery of gas caused by the damage of the valves liable to fail.

In 550, valves pending maintenance may be determined based on the third alternative valve and the first alternative valve.

In some embodiments, the gas company management platform may determine the valves pending maintenance based on the third alternative valve and the first alternative valve in various ways. For example, the gas company management platform may generate a list of the valves pending maintenance, and may store the first alternative valve and the third alternative valve to the list of the valves pending maintenance in sequence. In some embodiments, the list of the valves pending maintenance may include one or more valves pending maintenance, and an order of the valves in the list of the valves pending maintenance represents an order in which the valves pending maintenance are to be maintained. The order of the valves in the list of the valves pending maintenance may be determined based on the first calibration result, the second calibration result, and/or the maintenance frequency. More descriptions may be found in FIG. 2 and the related descriptions below.

In some embodiments, the gas company management platform may determine the maintenance order of the first alternative valve in various ways based on a feedback result of the smart gas government safety supervision management platform and a maintenance frequency of the gas pipelines. For example, the gas company management platform may sort damaged valves and/or valves that need to be repaired in the feedback result in a descending order according to the maintenance frequency, and set the maintenance order of the first alternative valve to a sorting result of descending ordering.

In some embodiments, the gas company management platform may obtain historical maintenance information of each gas pipeline through a gas user platform, and statistically obtain the maintenance frequency of each gas pipeline based on the historical maintenance information of each gas pipeline.

By combining the feedback result and the maintenance frequency of the gas pipelines, the degree of emergency and the risk of failure of the first alternative valve can be more accurately assessed, which in turn can more accurately determine the maintenance order of the first alternative valve; by maintaining the valves that have a relatively high maintenance frequency first, timely maintenance or replacement of aging or seriously worn valves can be guaranteed, which can reduce the downtime caused by valve failure, thereby improving the reliability and stability of the gas pipelines.

In some embodiments of the present disclosure, by setting the order in which individual valves are to be repaired, the priority of repairing valves that have a high count of failures can be increased; by predicting the second alternative valve through the faulty valve prediction model, reasonable allocation of repair resources can be guaranteed, the faulty valves can be more accurately determined, and the valves with a relatively high risk of failure can be repaired in time, thereby improving the safety of the gas pipeline system.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or feature described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or features may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various parts described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required features of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. An Internet of things (IoT) system for pipeline valve calibration based on smart gas safety supervision, comprising a smart gas government safety supervision management platform, a smart gas government safety supervision sensor network platform, a smart gas government safety supervision object platform, a gas company management platform, a gas company sensor network platform, a gas equipment object platform, and a gas equipment maintenance object platform; wherein
   the smart gas government safety supervision management platform is configured to generate a first calibration instruction and send the first calibration instruction to the gas company management platform;
   the gas company management platform is configured to:
   in response to determining that the first calibration instruction is received, or historical calibration times of gas pipelines exceeding a calibration time threshold is monitored, perform a first calibration on the gas pipelines and pipeline valves on the gas pipelines to determine a first calibration result;
   determine a flexible calibration batch based on sensing parameters and operation parameters;
   generate, based on the flexible calibration batch and the first calibration instruction, a second calibration instruction, and perform a second calibration on the gas pipelines and the pipeline valves on the gas pipelines to obtain a second calibration result;
   determine valves pending maintenance of the gas pipelines based on the first calibration result and the second calibration result; wherein
   the valves pending maintenance includes a first alternative valve and a third alternative valve, the third alternative valve is a second alternative valve of which a maintenance order satisfies a preset sorting condition, a maintenance priority of the first alternative valve is higher that a maintenance priority of the second alternative valve; the gas company management platform is further configured to:
   determine the first alternative valve based on a feedback result of the smart gas government safety supervision management platform, the first alternative valve including the valve pending maintenance which has a fault based on feedback from a gas user;
   determine the second alternative valve based on the first calibration result, the second calibration result, and the first alternative valve;
   determine a maintenance order of the second alternative valve based on the first calibration result and the second calibration result;
   determine the third alternative valve based on the maintenance order of the second alternative valve;
   determine the valves pending maintenance based on the third alternative valve and the first alternative valve;
   determine work order information based on the valves pending maintenance;
   determine a work order dispatch instruction based on the work order information and send the work order dispatch instruction to the gas equipment maintenance object platform; and
   generate, prior to maintaining the valves pending maintenance, a parameter adjustment instruction and adjust a working parameter of an auxiliary device operating in cooperation with the valves pending maintenance based on the parameter adjustment instruction.

2. The IoT system of claim 1, wherein the gas company management platform is further configured to:
   obtain a usage information sequence uploaded by a gas user from the gas equipment object platform;
   determine the flexible calibration batch based on the usage information sequence, the sensing parameters, and the operation parameters; and
   generate, based on the flexible calibration batch, the second calibration instruction and perform the second calibration on the gas pipelines and the pipeline valves on the gas pipelines to obtain the second calibration result.

3. The IoT system of claim 2, wherein the gas company management platform is further configured to:
   for one of the gas pipelines,
   determine a consistency between the usage information sequence and the operation parameters based on the usage information sequence and the operation parameters; and
   determine, based on a consistency sequence and the sensing parameters, the gas pipelines and the pipeline valves requiring the second calibration through a batch determination model and adjust the flexible calibration batch; wherein the consistency sequence is composed of consistencies of a plurality of gas pipelines, and the batch determination model is a machine learning model.

4. The IoT system of claim 1, wherein the gas company management platform is further configured to:
   determine a maintenance order of the first alternative valve based on the feedback result of the smart gas government safety supervision management platform and a repair frequency of the gas pipelines.

5. A method for pipeline valve calibration based on smart gas safety supervision, implemented based on a gas company management platform of an Internet of Things (IoT) system for pipeline valve calibration based on smart gas safety supervision, comprising:
   in response to determining that a first calibration instruction is received, or historical calibration times of gas pipelines exceeding a calibration time threshold is monitored, performing a first calibration on the gas pipelines and pipeline valves on the gas pipelines to determine a first calibration result;

determining a flexible calibration batch based on sensing parameters and operation parameters;

generating, based on the flexible calibration batch and the first calibration instruction, a second calibration instruction, and performing a second calibration on the gas pipelines and the pipeline valves on the gas pipelines to obtain a second calibration result;

determining valves pending maintenance of the gas pipelines based on the first calibration result and the second calibration result; wherein the valves pending maintenance includes a first alternative valve and a third alternative valve, the third alternative valve is a second alternative valve of which a maintenance order satisfies a preset sorting condition, a maintenance priority of the first alternative valve is higher that a maintenance priority of the second alternative valve; the determining valves pending maintenance of the gas pipelines based on the first calibration result and the second calibration result includes:

determining the first alternative valve based on a feedback result of the smart gas government safety supervision management platform, the first alternative valve including the valve pending maintenance which has a fault based on feedback from a gas user;

determining the second alternative valve based on the first calibration result, the second calibration result, and the first alternative valve;

determining a maintenance order of the second alternative valve based on the first calibration result and the second calibration result;

determining the third alternative valve based on the maintenance order of the second alternative valve;

determining the valves pending maintenance based on the third alternative valve and the first alternative valve;

determining work order information based on the valves pending maintenance;

determining a work order dispatch instruction based on the work order information and sending the work order dispatch instruction to a gas equipment maintenance object platform; and generating, prior to maintaining the valves pending maintenance, a parameter adjustment instruction and adjusting a working parameter of an auxiliary device operating in cooperation with the valves pending maintenance based on the parameter adjustment instruction.

6. The method of claim 5, further comprising:

obtaining a usage information sequence uploaded by a gas user from a gas equipment object platform;

determining the flexible calibration batch based on the usage information sequence, the sensing parameters, and the operation parameters; and generating, based on the flexible calibration batch, the second calibration instruction and performing the second calibration on the gas pipelines and the pipeline valves on the gas pipelines to obtain the second calibration result.

7. The method of claim 6, wherein the determining the flexible calibration batch based on the usage information sequence, the sensing parameters, and the operation parameters includes:

for one of the gas pipelines, determining a consistency between the usage information sequence and the operation parameters based on the usage information sequence and the operation parameters; and determining, based on a consistency sequence and the sensing parameters, the gas pipelines and the pipeline valves requiring the second calibration through a batch determination model and adjusting the flexible calibration batch; wherein the consistency sequence is composed of consistencies of a plurality of gas pipelines, and the batch determination model is a machine learning model.

8. The method of claim 5, wherein the determining the first alternative valve based on the feedback result of the smart gas government safety supervision management platform includes:

determining a maintenance order of the first alternative valve based on the feedback result of the smart gas government safety supervision management platform and a repair frequency of the gas pipelines.

* * * * *